(12) United States Patent
Parks

(10) Patent No.: US 7,774,974 B1
(45) Date of Patent: Aug. 17, 2010

(54) FISHING LURE

(76) Inventor: Steve Parks, 295 SW. Brushy Mound Rd., Burleson, TX (US) 76028

( * ) Notice: Subject to any disclaimer, the term of this patent is extended or adjusted under 35 U.S.C. 154(b) by 0 days.

(21) Appl. No.: 11/602,088

(22) Filed: Nov. 20, 2006

(51) Int. Cl.
 *A01K 91/00* (2006.01)
(52) U.S. Cl. ..................................... 43/42.28; 43/42.24
(58) Field of Classification Search ........................ None
 See application file for complete search history.

(56) References Cited

U.S. PATENT DOCUMENTS

| | | | |
|---|---|---|---|
| D138,381 S | 7/1944 | Richards | |
| 2,847,791 A | 8/1958 | Simmons | |
| 3,218,750 A | 11/1965 | Lewin | |
| D217,453 S | 5/1970 | Blaser | |
| D232,549 S | 8/1974 | Vidler | |
| D240,920 S | 8/1976 | Smithwick | |
| 4,044,492 A | 8/1977 | Ingram | |
| 4,177,597 A | 12/1979 | Thomassin | |
| 4,197,667 A | 4/1980 | Helfenstine et al. | |
| D263,988 S * | 4/1982 | Williams, Jr. ............... | D22/133 |
| D289,789 S * | 5/1987 | Ditto ......................... | D22/127 |
| 4,785,569 A | 11/1988 | Thomas, Jr. | |
| D299,263 S | 1/1989 | James | |
| 4,856,223 A | 8/1989 | Evans | |
| 4,887,377 A * | 12/1989 | Morris ....................... | 43/42.24 |
| 5,009,024 A | 4/1991 | Parman | |
| D350,382 S | 9/1994 | Mann | |
| 5,428,918 A | 7/1995 | Garrison | |
| 5,465,523 A * | 11/1995 | Garst ......................... | 43/42.24 |
| D385,614 S | 10/1997 | Yano | |
| D391,618 S | 3/1998 | Yano | |
| 5,826,367 A | 10/1998 | Murphy | |
| D462,736 S | 9/2002 | Bayhi | |
| D474,830 S | 5/2003 | Littleton | |
| D480,780 S | 10/2003 | Chambers, Sr. | |
| 6,634,135 B1 * | 10/2003 | Rydell ........................ | 43/42.1 |
| D499,461 S | 12/2004 | Chambers, Sr. | |
| 6,843,017 B1 | 1/2005 | Chambers, Sr. | |
| 6,857,220 B2 | 2/2005 | King | |
| 6,860,058 B2 * | 3/2005 | Ito ............................. | 43/42.28 |

(Continued)

FOREIGN PATENT DOCUMENTS

FR 2145083 2/1973

(Continued)

OTHER PUBLICATIONS

QCM Industrial Lure Plastisots, 4 pages, QCM Company, Kent, Washington, www.qcminds.com.

(Continued)

*Primary Examiner*—Christopher P Ellis
(74) *Attorney, Agent, or Firm*—Geoffrey A. Mantooth

(57) ABSTRACT

A fishing lure has a body and a tail. The tail is coupled to one end of the body. The tail has a center portion and an outside edge that is arcuate around the center portion. A gap extends from the outside edge to the center portion. In one embodiment, the outside edge is thicker than the center portion of the tail. When the lure is retrieved, the tail moves back and forth and creates a noise and also causes the body to move back and forth, thus producing a desirable action.

20 Claims, 6 Drawing Sheets

U.S. PATENT DOCUMENTS

| | | | |
|---|---|---|---|
| 6,922,939 | B2 | 8/2005 | Moorhouse |
| 7,080,476 | B2 | 7/2006 | King |
| D549,300 | S | 8/2007 | Harrell |
| 2005/0120612 | A1 | 6/2005 | Chambers, Sr. |
| 2006/0042149 | A1 | 3/2006 | Berdine |
| 2006/0117642 | A1 | 6/2006 | Huddleston |

FOREIGN PATENT DOCUMENTS

| | | |
|---|---|---|
| FR | 2604056 | 3/1988 |
| JP | 410117635 A | 5/1998 |
| JP | 11-113448 | 4/1999 |

OTHER PUBLICATIONS

Plastisol Fishing Lure Compounds, 2 pages, Chemionics Corporation, www.chemionics.com.

Barlow's Tackle Express, Worm Plastic, Softener, Hardener and Melting Pan, 1 page, Barlows Tackle Shop, www.barlowstackle.com.

PVC Handbook, Charles E. Wilkes, Charles A, Daniels and James W. Summers, Hanser, Plasticizers pages cover, 182-183, www.hanser.de.

Backwater's, The Fishing Authority, Paca Chunk, 4 pages, Backwaters .Online, Somerset, KY, www.backwatersonline.com.

* cited by examiner

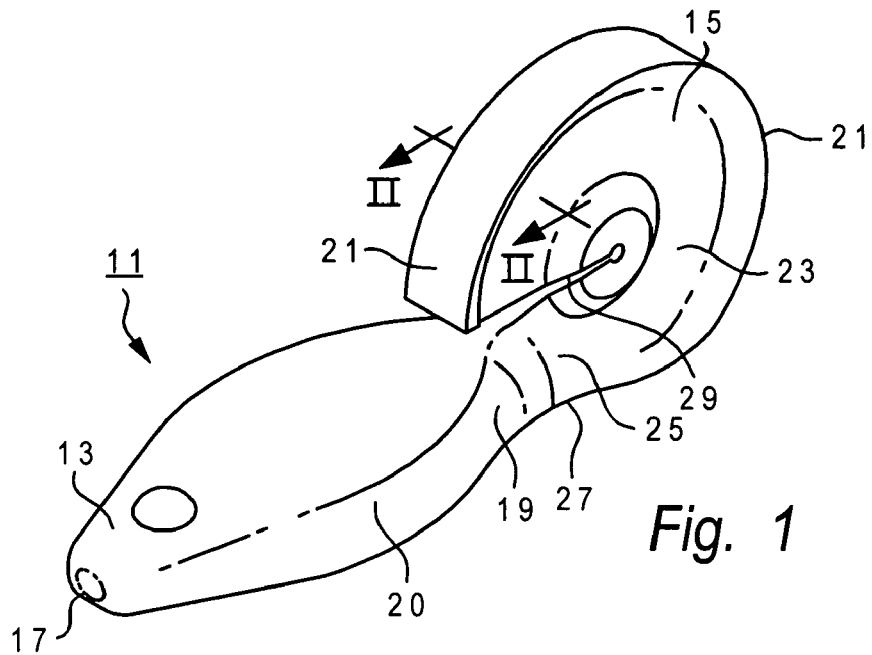
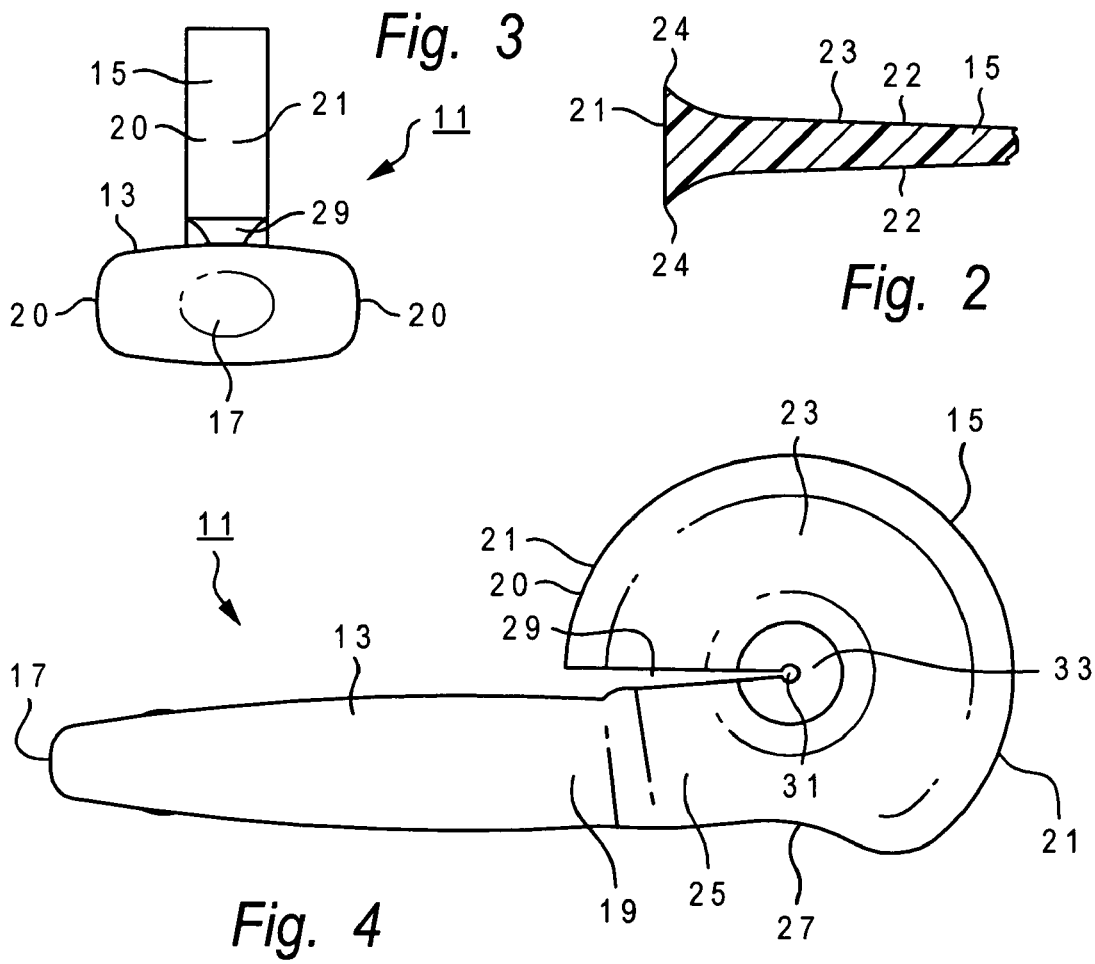

FISHING LURE

FIELD OF THE INVENTION

The present invention relates to fishing lures.

BACKGROUND OF THE INVENTION

Fishing lures are made of a variety of materials and a variety of designs. One type of lure uses soft plastic that is shaped like a frog, worm, or other bug or animal which fish prey upon. The lure has a body and a tail.

A fisherman casts the lure and then begins to retrieve it. Ideally, the lure attracts the attention of fish both visually and by making a noise during the retrieve. The movement of the lure, which provides both visual attention and makes a noise, is referred to by fishermen as "action". A lure with good action is thought to catch fish.

One problem is that lures are frequently cast over beds of weeds. Fish often hide in such weed beds. Retrieving the lure often means that the lure gets hung on the weeds or the weeds are pulled up by the lure and interfere with the lure's action. Another problem is that lures have insufficient action, even when without weeds; that is the tails do not move very well and consequently do not attract fish.

BRIEF DESCRIPTION OF THE DRAWINGS

FIG. 1 is an isometric view of a fishing lure of the present invention, in accordance with a preferred embodiment.

FIG. 2 is a cross-sectional view of a portion of the tail, taken through lines II-II of FIG. 1.

FIG. 3 is a front end view of the lure of FIG. 1.

FIG. 4 is a side elevational view of the lure of FIG. 1.

DESCRIPTION OF THE PREFERRED EMBODIMENTS

Figure 5:
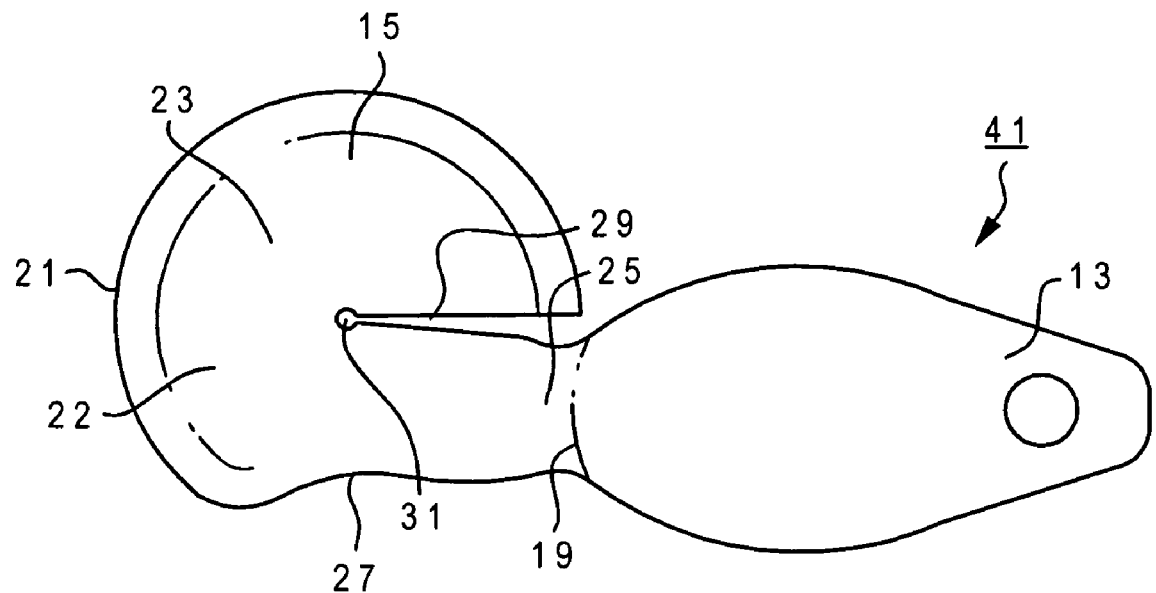
FIG. 5 is a top plan view of a fishing lure in accordance with another embodiment.

Referring to FIG. 1, the present invention provides a fishing lure 11 having a body 13 and a tail 15. The tail 15 provides action as the lure moves through the water. As the lure is retrieved, water flows across the tail, causing the tail to move and make a noise, like a gurgle. In addition, the tail causes the body to move back and forth, mimicking the natural movement of live bait. Such action catches the attention of fish.

In addition, the tail 15 is weedless. If passed over or through weeds, the tail will not snag in the weeds. Nor will the tail catch and trail weeds. Thus, weeds do not interfere with, or denigrate the action of, the tail.

Various embodiments will now be discussed. Some embodiments use like parts. Like reference numbers indicate like parts between embodiments.

The fishing lure is preferably made of soft plastic, which is common in the fishing lure industry. The plastic is flexible and elastomeric. Alternatively, the fishing lure can be made from other materials that are flexible and suitable for fishing.

In general, and using FIGS. 1, 3 and 4 as an example, the body 13 is typically longer than it is wide or high in order to provide some streamlining as the lure moves through the water. The outside surface of the body can be smooth or ribbed. Ribbed bodies are used to provide more turbulence and action to the lure. The body has two ends, namely a front end 17 and a rear end 19. The tail 15 is coupled to the rear end 19, while the front end points in the direction of travel. The body 13 has a width, which extends between two sides 20. The body also has a height, which extends between the top and bottom. Referring to the orientation shown in FIG. 3, the width is horizontal, while the height is vertical.

Figure 7:
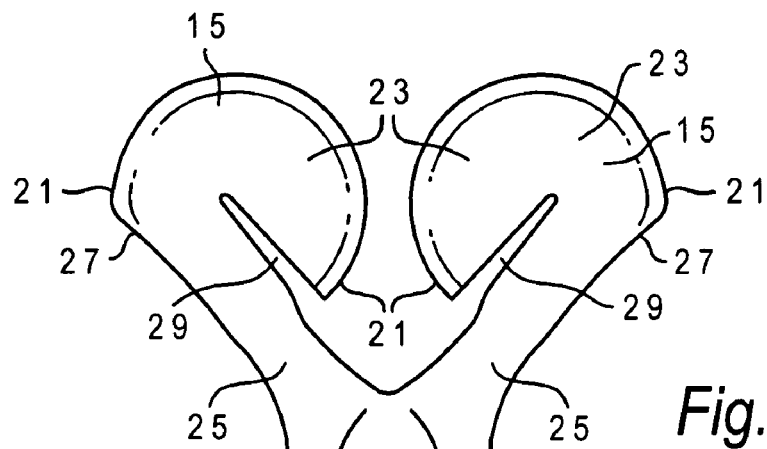
FIG. 7 is a top view of a fishing lure in accordance with still another embodiment.
Figure 12:
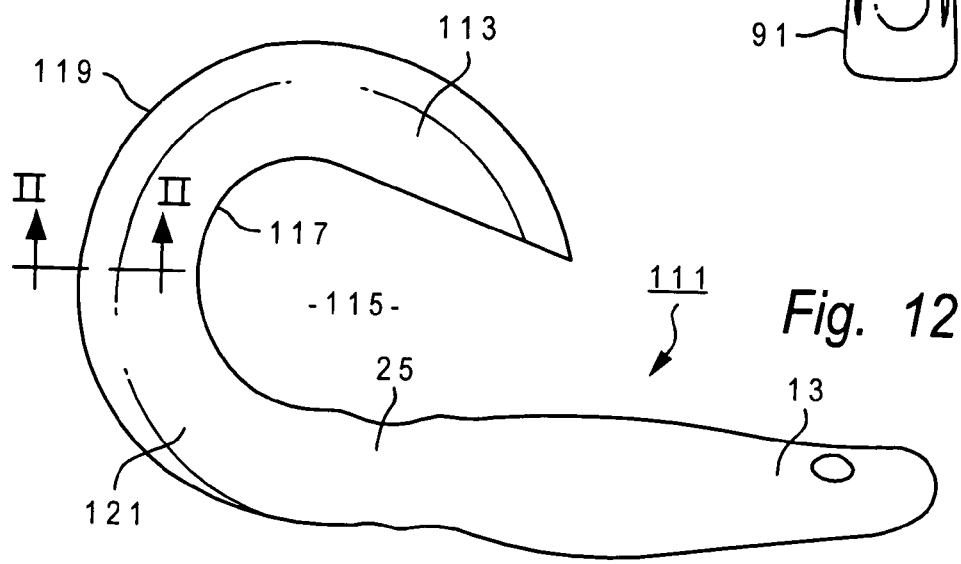
FIG. 12 is a side elevational view of a fishing lure in accordance with still another embodiment.
Figure 14:
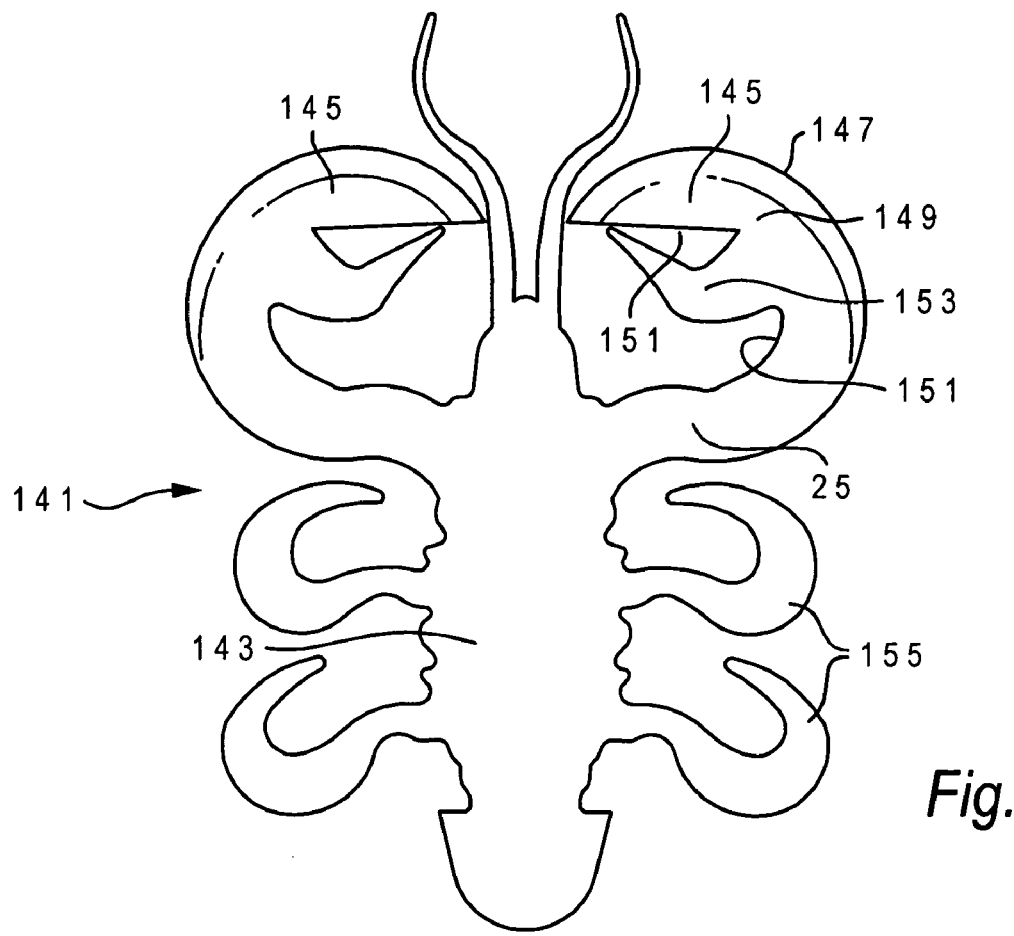
FIG. 14 is a top plan view of a fishing lure in accordance with still another embodiment.
Figure 15:
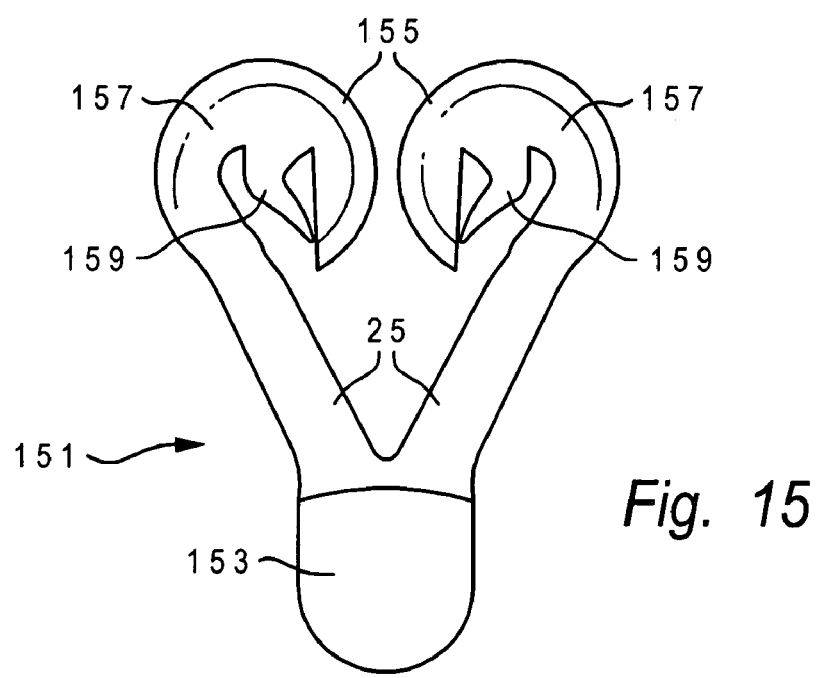
FIG. 15 is a top plan view of a fishing lure in accordance with still another embodiment.

The body can be shaped like a fish as shown in FIGS. 1, 5, 9-10 and 16, a frog as shown in FIG. 7, a crawfish as shown in FIG. 14, or can be of some other shape as shown by way of example in FIGS. 12 and 15. Other examples of body shapes include a grub, a worm, a bug, etc. The body can be any color and can include or exclude glitter. The body can have legs, fins or other appendages, which appendages are in addition to the tail 15.

Figure 10:
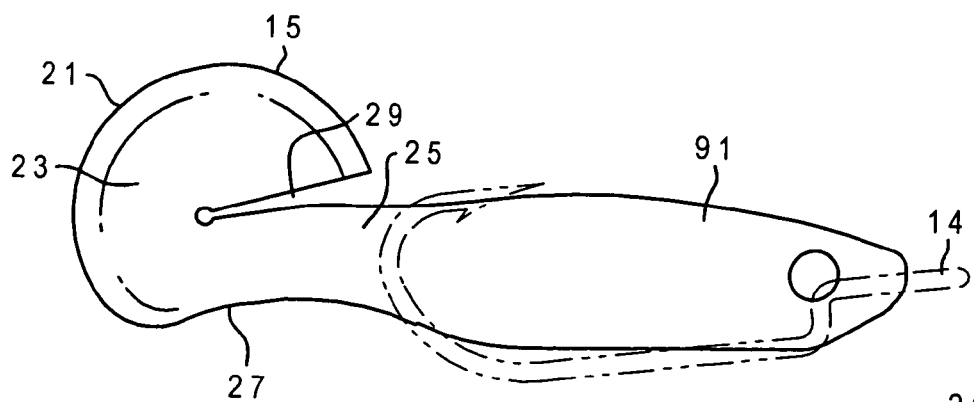
FIG. 10 is a side elevational view of a fishing lure in accordance with still another embodiment.

The body 13 typically receives a hook. The hook can be inserted into the body in a number of ways. For example, the barb and point are located above the body, while the shank is located inside of the body. Another way is shown in FIG. 10, where the hook 14 is shown in dashed lines. This is a weedless rig. The eye of the hook, where the fishing line is attached, it typically located at or near the front end 17.

In the embodiment shown in FIGS. 1-4, the body width is at least 1.5 times the body height. Having a wide body provides stability to the lure, allowing the lure to be retrieved with the top side staying on top. The lure resists rolling over on a side. This is a particularly true with a tail 15 that is vertically oriented, as shown in FIGS. 1, 3 and 4.

As shown in FIG. 1, the tail 15 is coupled to the body 13. The tail 15 has an outside surface 21 and a center portion 23. The outside surface 21 is arcuate, as can be seen in FIG. 4. Referring to the orientation shown in FIG. 4, the outside surface begins at the lower right of the Fig. (by the portal 27) and extends away from the body 13 before curving around and extending toward the body (by the gap 29). In the embodiment shown in FIGS. 1, 3 and 4, the tail 15 is generally disc-shaped when viewed from the side.

The tail 15 also has side surfaces 22 (see FIG. 2). The side surfaces 22 merge with the outside surface 21 or outside edge. The side surfaces 22 diverge from each other from the center portion 23 to the outside surface 21 so as to form lips 24. Thus, the thickness of the tail is greater at the lips 24 than at the center portion 23. In the center portion 23, the thickness is measured as between the side surfaces 22. At the outside surface 21, the thickness is measured between the edges formed at the outside surface and the lips. The side surfaces 22 can diverge in a number of geometrical configurations. In the preferred embodiment, the side surfaces 22 are parallel to each other at the center portion and then curve outwardly to the respective outside surface. This creates a lip or projection in proximity to the outside surface. In the preferred embodiment, there is a lip on both sides of the tail, as shown in FIG. 2. Alternatively, there could be a lip only on one side of the tail.

The lip 24 could be formed in a number of other ways. For example, the side surfaces 22 need not be parallel to each other. The side surfaces do not have to have curved portions; instead flat portions (when viewed in cross-section) can be used, with angles between the flat portions.

Figure 2A:
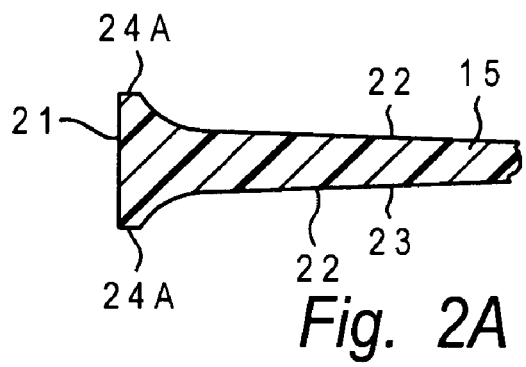
FIG. 2A is a cross-sectional view of a portion of the tail, showing a different cross-sectional shape than in FIG. 1.

The outside surface 21 is typically flat when viewed in cross-section as shown in FIG. 2. The outside surface can be indented or can extend radially out, such as in curved bulge. The outside surface can be smooth or textured. The outside surface 21 is at least twice as thick as the center portion thickness; in the preferred embodiment, the outside surface is three times thicker than the center portion. The center portion is measured at the smallest wall thickness. FIG. 2A shows another embodiment of the tail cross-section. Each outside edge 24A is an annular surface. This increases the mass at the outside of the tail. In other embodiments, the radius of curvature of the side surfaces near the outside edges can be increased or decreased.

The tail 15 has a coupling portion 25; the tail is coupled to the body 13 by the coupling portion 25. The thicker outside surface 21 does not extend fully around the tail. At the coupling portion 25, the tail has an outside edge 27 that is of a reduced thickness relative to the remainder of the outside surface and can be the same thickness as the center portion 23. This thin edge portion forms a portal 27 which serves as an access area for water flow.

The tail 15 has a gap 29 that extends from the outside surface 21 to the center portion 23. The gap 29 allows the tail to move more freely. The gap, at the outside surface, is located near the coupling portion 25. The coupling portion 25 of the tail is interposed between the gap 29 and the portal 27. The gap 29 can be a slot or a slit cut into the tail, as shown in FIGS. 1 and 4. In the preferred embodiment, the closed end 31 of the gap 29 is rounded so as to minimize propagation of the slit further through the tail. In addition, the material 33 around the closed end of the gap can be slightly thicker so as to reinforce the tail wall at the end of the gap 29 and minimize slot propagation. Thus, some of the center portion 23 can be thicker so as to minimize tearing. This thicker reinforcing portion 33 is thinner than the outside surface 21. With the reinforcing portion 33, the thinnest part of the central portion 23 is annular and is between the outside surface 21 and the reinforcing portion 33. Although the reinforcing portion 33 is shown only in FIGS. 1 and 4, it can be used on all embodiments and is particularly useful with narrow gaps of the slot type.

As discussed above, in the particular embodiment shown in FIGS. 1, 3 and 4, the fishing lure body 13 is wider than it is high and the tail 15 is vertically oriented. Thus, the tail is erect in the height direction. This is best viewed when the lure is in water when buoyancy comes into play. The wide body provides stability in maintaining the tail in a vertical orientation. This is particularly true when the lure is in the water, The operation of the lure 11 will now be described. As the fishing lure moves through the water, such as by a retrieve, the water hits the forward part 20 of the blunt outside surface 21, which is located above the gap 29. Because the tail is made of soft flexible material, the forward part is forced back, effectively opening or enlarging the gap 29. Water flows through the portal 27 and across the center portion 23 on both sides of the tail. The water flows across the center portion 23 and then encounters the raised lips 24, which lips force a change in direction of the water. This causes the tail to move rapidly back and forth. When the forward portion of the outside edge is forced back, the tail takes on a corkscrew shape. The tail twists or moves back and forth. When the lure is retrieved across the top of the water, the movement of the tail breaks the top of the water, creating gurgling sound that fish find attractive. The amount of action of the tail depends on the speed of the retrieve. Fast retrieves cause faster action and noisier sounds.

The movement of the tail 15 is transferred to the body 13, wherein the body moves. Thus, during a retrieve, not only does the tail 15 move and create noise, but the front end 17 of the body moves from side to side, mimicking natural live bait movements and providing enhanced bait action. The tail 15 in effect wags the lure body 13. The amount of movement of the body depends on the relative size and mass of the tail and the body. A heavier and larger tail will cause the body to move more. Also, the speed of retrieve is a factor in body movement.

The fishing lure, with its tail, can be retrieved through weeds, moss, etc. and will not catch or snap. Furthermore, the tail will not collect weeds or moss; the soft plastic lacks the rigidity for pulling weeds or moss. The lure 11 can be fished on top of the water (that is on the surface).

The lures described herein can be made in a variety of sizes. In order to have the tail moving the body, size of the tail is matched to the body. For example, with a body that is 2.5 inches long and 1.5 inches wide, the tail can be 1.5 inches in diameter. The plastic durometer has an effect on the movement of the tail. For a softer durometer, the tail can be thicker at the center portion 23 and/or the diameter can be larger, wherein for a harder durometer, which makes a stiffer tail of the same thickness, the tail can be thinner to compensate.

Figure 6:
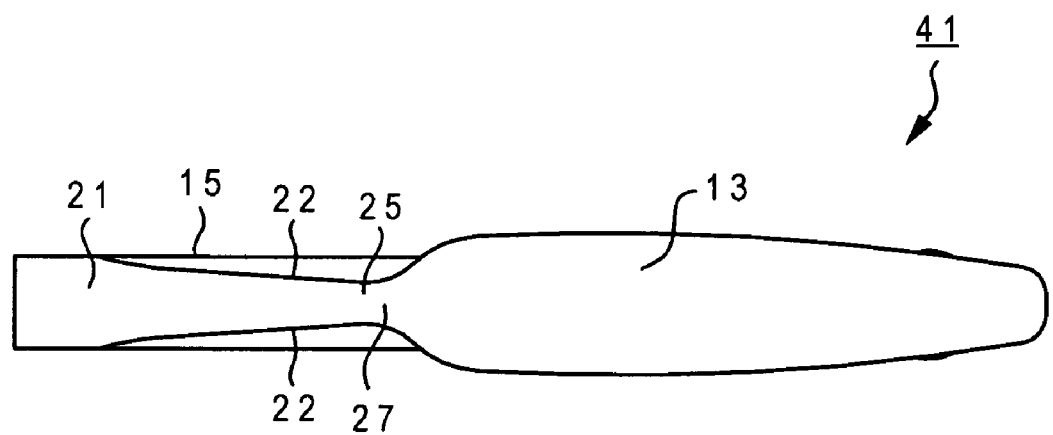
FIG. 6 is a side elevational view of the lure of FIG. 5.

The tail 15 described with reference to the embodiment of FIG. 1 can be used with other body types and lures. For example, FIGS. 5 and 6 show another embodiment of the fishing lure 41, wherein the body 13 is wider than it is high in cross-section, but the tail is horizontally oriented. FIG. 6 in particular shows the portal 27, with its reduced thickness, edge on. FIG. 7 shows a fishing lure 51 in accordance with another embodiment. The fishing lure has two tails 15, spaced apart from each other. Each tail has a coupling portion 25 that is joined to the body 53. The body 53 has a rear end that has split coupling portions 25 extending rearwardly on each side. The gap 29 in each tail is relatively thin. As the lure 51 is retrieved in water, the two tails twist or move back and forth and make noise. The body 51 is shown shaped like a frog and is wider than it is high. Because two tails are used, which tails are spaced apart, the tails do not impart as much movement to the body 53 as in the lure 11.

Figure 8:
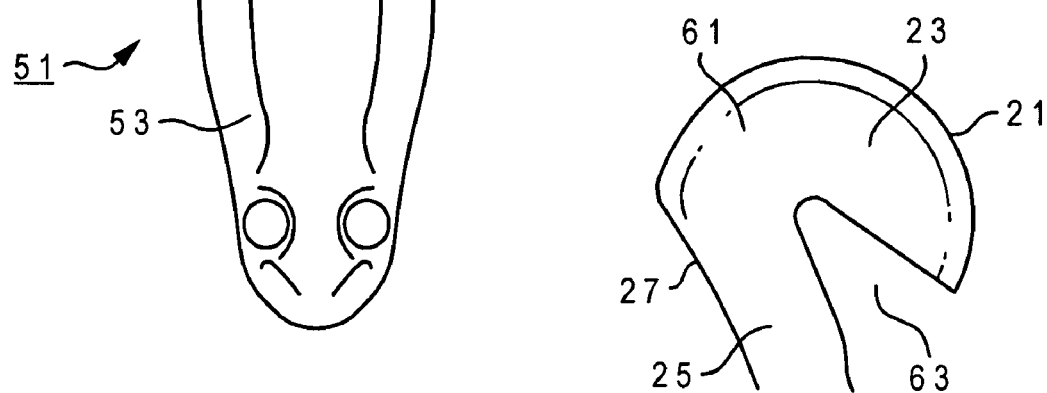
FIG. 8 is a detail view of a tail in accordance with still another embodiment.

FIG. 8 shows a tail 61 having a gap 63 that is wider than the gaps of the tails of FIGS. 1, 4 and 7. Instead of a single cut to form a slit, the gap 63 is formed by cutting out some of the center portion 23. Of course, the tail and gap can be made without actually cutting out or removing material to form the gap. As an example, the tail and gap can be made by molding. The tail 61 can be used on all of the lures of the present invention.

Figure 9:
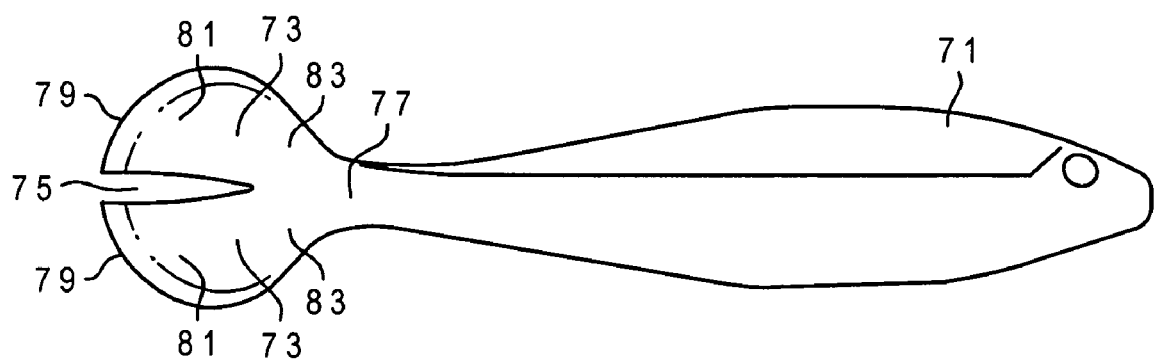
FIG. 9 is a side elevational view of a fishing lure in accordance with still another embodiment.

FIG. 9 shows a lure 71 with a tail 73 that is in accordance with another embodiment. The body is shaped like a minnow and is higher than it is wide. The tail 73 has two pieces. Each tail piece 73 has a coupling portion 77, wherein the tail piece is coupled to the body. The tail pieces are separated from each other by a gap 75 that extends rearwardly from the coupling portion 77. The gap 75 extends rearwardly along or adjacent to the longitudinal axis of the body 71. Each tail piece 73 has an outside surface 79 which is thicker and raised with respect to the center portions 81. The rear edges 79 form a circular arc. Each outside surface 79 extends from the gap 75 radially out and then curves toward the direction of the body. Each tail piece also has a thin portal 83. As the lure 71 is retrieved, the tail pieces 73 move independently of each other.

Figure 11:
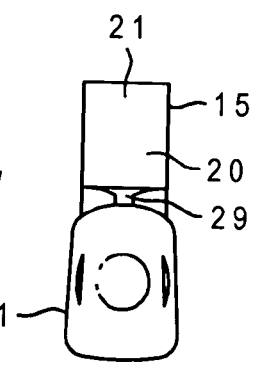
FIG. 11 is a front end view of the lure of FIG. 10.

FIGS. 10 and 11 show a fishing lure 91 in accordance with another embodiment, wherein the body 13 is, in cross-section, higher than it is wide. The tail 15 is vertically oriented. FIG. 10 illustrates one way to insert a hook 14 into the body.

In operation, during a retrieve of the lure 91, the tail 15 moves as discussed above. The tail 15 also causes the body 91 to move, although in a somewhat different manner than the lure of FIG. 1. The entire body 91 tilts or rolls from side to side, flashing its sides and belly. If the body is colored with a dark back and light sides and belly, this tilting or rolling mimics fish. The body does not corkscrew.

As discussed above with respect to FIG. 1, in order to have the tail moving the body and provide the desirable action and avoid corkscrewing, the size of the tail is matched to the body. For example, with a body that is 2.5 inches long and 0.5 inches wide, the tail can be 1.5 inches in diameter. The plastic durometer has an effect on the movement of the tail. For a softer durometer, the tail can be thicker at the center portion 23, wherein for a harder durometer, which makes a stiffer tail of the same thickness, the tail can be thinner to compensate. In addition, for a harder durometer, the diameter of the tail is reduced.

FIG. 12 shows a fishing lure 111 in accordance with another embodiment. The body 13 is wide, as discussed in FIG. 1. The body of the lure 111 is flatter and sleeker than the body of the lure 11 of FIG. 1. The tail 113 is vertically oriented when the lure is in water and is stationary. The wide body 13 maintains the tail 113 in a vertical orientation. The gap 115 in the tail 113 is larger than the gap in FIGS. 1 and 8 and forms a crescent of the tail 113. The thickness of the tail has the profile of FIG. 2 or 2A, being thin at the leading edge 117 and thicker at the trailing, or outside edge or surface 119. A center portion 121 is between the leading and trailing edges 117, 119. Because the gap 115 is larger, the tail does not require a portal on the outside edge 119.

Figure 13:
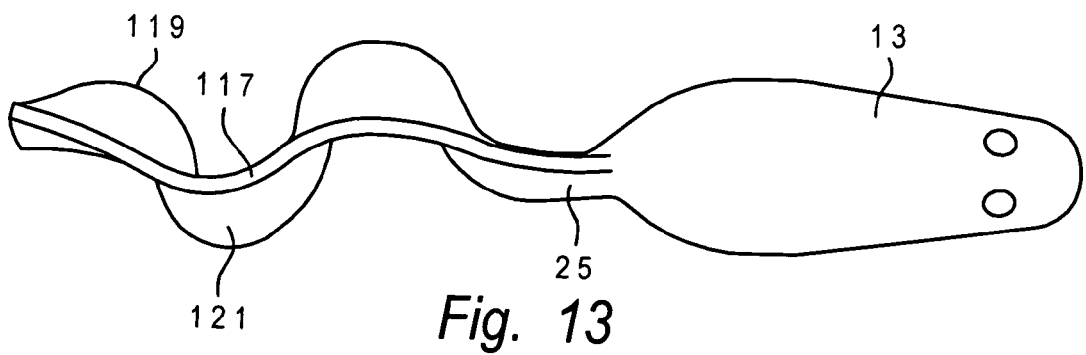
FIG. 13 is a top view of the lure of FIG. 12 shown with the tail in action.

The lure 111 has excellent action. During a retrieve, the tail 113 extends rearwardly and moves or whips around creating movement and noise. FIG. 13 illustrates the tail in a moving configuration. As can be seen, the tail extends rearwardly of the body and is in a wavy or undulating orientation. The undulations propagate along the tail from the front to the rear as the lure is retrieved. In addition, the inner and outside edges 117, 119 move in a wavy fashion. The tail 113 moves the body 13. The action of the body is larger for the lure 111 of FIGS. 12 and 13 than for the lure 11 of FIG. 1. For the lure 111, the entire body, not just the front end, moves from side to side. The motion of the lure 111 through the water mimics a snake or eel.

The lure 111 can be retrieved in intermittent motions. For example, the lure can be retrieved for a distance and then the retrieve is stopped. During the stop, the lure sinks to the bottom. As the lure sinks to the bottom, the tail and body move as during a retrieve, although typically the movement during a drop is slower. This is true of all of the weighted lures discussed herein, although with the lure 111 of FIGS. 12 and 13, the side to side movement is more pronounced.

As an alternative to the tail profiles already discussed and shown in FIGS. 2 and 2A, the cross-section of the tail 113 can be triangular, wherein the leading edge 117 is an apex of the triangle and the outside surface 119 is a side of the triangle opposite of the leading edge apex. Still another alternative of the tail cross-section is a diamond shape, with the leading edge forming one apex, the trailing edge forming the opposite apex and the two outside edges forming the intermediate apexes. Still another alternative of the tail cross-section is rectangular, or of relatively constant thickness from the leading edge 117 to the outside surface 119.

As discussed above with respect to FIG. 1, in order to have the tail moving the body to avoid corkscrewing or twisting, the size of the tail is matched to the body. For example, with a body that is 2.5 inches long and 1.0 inches wide, the tail can form a crescent that is about 3.0 inches in diameter. The thickness of the coupling portion 25 has an effect on the movement of the tail. An example thickness of the coupling portion is ⅜ inches. If the coupling portion is made thicker, for example, to ½ inches, then the outside surface 119 can be made thicker. Also, the tail can be of constant thickness from the leading edge 117 to the outside surface 119. The plastic durometer has an effect on the movement of the tail. For a softer durometer, the tail can be thicker at the outside surface 119 and coupling portion 25, wherein for a harder durometer, the tail and coupling portion can be thinner to compensate. A sleeker body 13 requires a tail 113 that is less powerful and produces less force to move the body. A less powerful tail can be thinner and of a larger diameter across the crescent.

FIG. 14 illustrates a lure 142 having a crawfish body 143. The body is shaped so that the head of the crawfish faces to the rear, because crawfish scoot backwards. Instead of claws, the lure has the tail 145 of the present invention. Each tail 145 has an outside surface 147 that is thicker than the center portion 149. The leading edge 151 of the center portion is thin relative to the outside surface. The tail is shaped somewhat like a crescent and forms an outer claw. The tail also has an inner claw 153 that is thin. The inner claw extends into the gap that is formed by the crescent shaped outer claw. The combination of the inner claw and the outer claw, with the change in thickness from the leading edge to the outside surface, produces an action during retrieve that is noisy and desirable. The body can have legs 155 that are curved and of constant thickness.

FIG. 15 shows a jig trailer 151 that has a body 153 and two tails 155. The tails 155 are like the crawfish tails 145, with outer and inner claws 157, 159, but the outer claws 157 curve in more toward the body 153.

Figure 16:
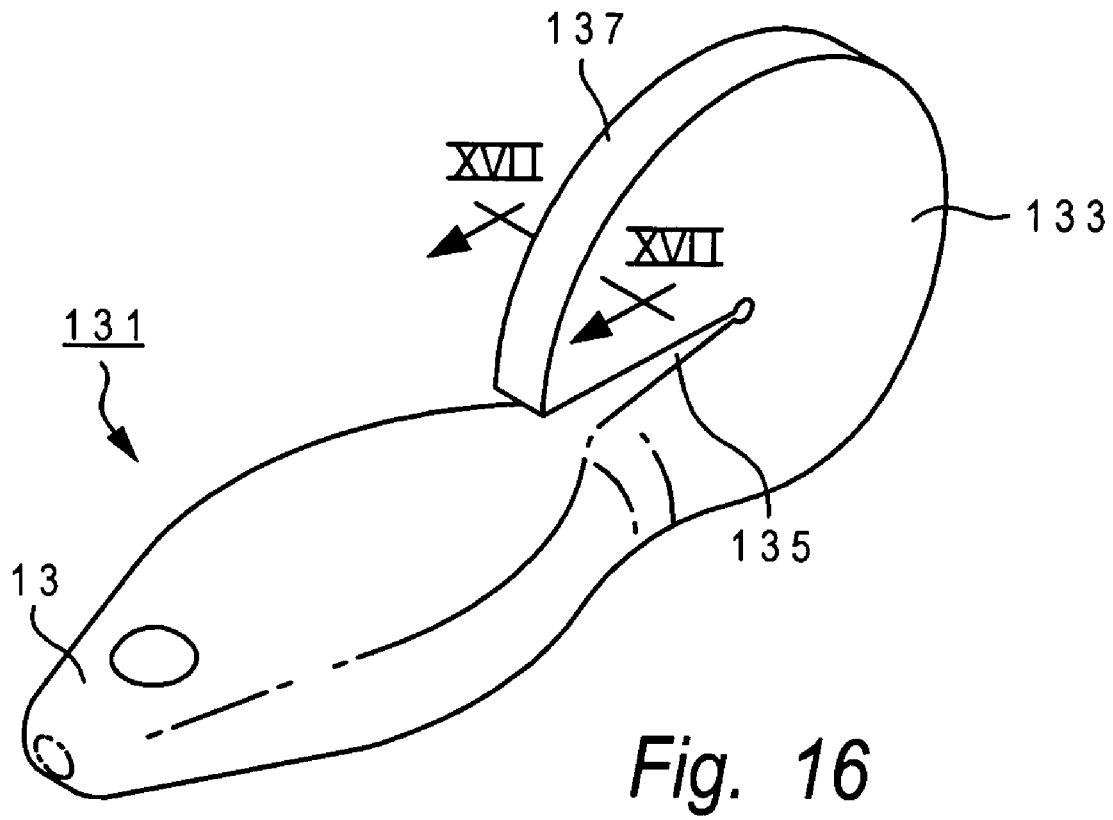
FIG. 16 is an isometric view of a fishing lure in accordance with still another embodiment.
Figure 17:
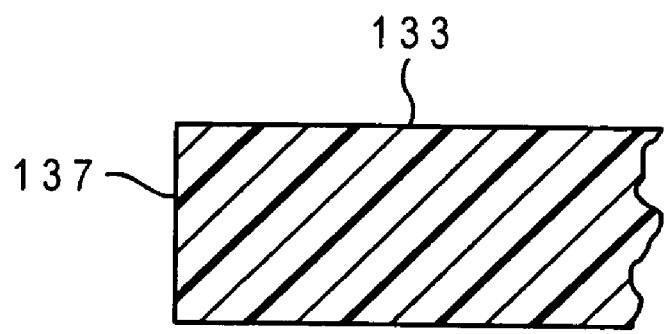
FIG. 17 is a cross-sectional view of the tail, taken through lines XVI-XVI of FIG. 16.

FIGS. 16 and 17 show a fishing lure 131 in accordance with another embodiment. The tail 133 is similar to the tail of FIG. 1, except the tail has a constant thickness from the center portion to the outside surface. The thickness of the tail can be 3/32-¼ inches. The body 13 is wider than it is high, in order to provide stability to the vertically oriented tail. The gap 135 is a slot that is narrower when the tail is at rest. The outside surface 137 of the tail can be either blunt, as shown, or tapered. This tail will move and provide action, although at a reduced amount when compared to the tail 15 of FIG. 1.

In general, the lures disclosed herein can be fished on the surface of water or subsurface. To fish a lure subsurface, weight is added. The lures of FIGS. 1-8 and 16-17 are typically fished only on the surface.

The foregoing disclosure and showings made in the drawings are merely illustrative of the principles of this invention and are not to be interpreted in a limiting sense.

The invention claimed is:

1. A fishing lure, comprising:
   a) a body having two ends, the body having a width and a height, the body width being greater than the body height;

b) a tail having a coupling portion that is coupled to one of the body ends, the tail having a center portion that is attached to the coupling portion, the center portion forming an interior of the tail, the center portion having an arcuate outside edge, a gap extending in the center portion toward the outside edge, the gap forming an inside edge, the outside edge having a greater length than the inside edge, the center portion having a lip that protrudes from the center portion at the outside edge, the tail having a width and a height when the lure is at rest in water, the tail width being measured at the lip, the tail width being oriented with the body width, the tail height being greater than the tail width, the body width being greater than the tail width.

2. The fishing lure of claim 1 wherein the outside edge of the center portion is arcuate and extends away from the body and then in a direction toward the body, the tail radiates out toward the outside edge, with the center portion interposed between the gap and the lip.

3. The fishing lure of claim 1 wherein the tail comprises a portal that is adjacent to the coupling portion, the lip extending from the portal, the portal being thinner than the lip.

4. The fishing lure of claim 1 wherein the outside edge is at least two times thicker than the center portion.

5. The fishing lure of claim 1 wherein the body has a width greater than a height, the tail being horizontally oriented.

6. The fishing lure of claim 1 wherein the tail is shaped like a crescent.

7. The fishing lure of claim 1 wherein the tail is a first tail, further comprising a second tail coupled to the body and spaced from the first tail, the second tail having a coupling portion and a center portion, the second tail center portion having a second outside edge, the second tail center portion having a second lip that protrudes from the second tail center portion.

8. The fishing lure of claim 7 wherein the second tail further comprises a second gap extending in the second tail center portion, each of the first and second tails further comprising an inner claw that extends into the respective gap.

9. The fishing lure of claim 1 wherein the gap has a closed end in the center portion, the center portion has increased thickness at the closed end of the gap.

10. A soft plastic fishing lure, comprising:
a) a body;
b) a member coupled to the body so that the member can move with respect to the body, the member having side surfaces, the member having a curved outside edge, the member having an inside edge that is shorter than the outside edge, the side surfaces interposed between the inside and outside edges, at least one of the side surfaces having a flange protruding therefrom, the flange located at the outside edge wherein when the member is viewed so as to see the one side surface, the one side surface having an area and the flange having an area, the area of the side surface being greater than the area of the flange, which flange interrupts the flow of water across the respective side surface when the lure moves in water, wherein the member moves with respect to the body as the lure moves in water.

11. The lure of claim 10 wherein the member is a tail.

12. The lure of claim 10 wherein the member is an arm.

13. The lure of claim 10 wherein the body has an upstream end during a retrieve operation of the lure, wherein when the lure is at rest, at least part of the respective side surface is located upstream of the flange.

14. The lure of claim 10 wherein the member has an inner projection in the same direction as the side surfaces.

15. The lure of claim 10 wherein each side surface has a flange protruding therefrom.

16. The lure of claim 10, wherein:
a) the body has an upstream end during a retrieve operation of the lure, wherein when the lure is at rest, at least part of the respective side surface is located upstream of the flange;
b) each side surface has a flange protruding therefrom.

17. The lure of claim 10 wherein the lure is a top water lure, with the body having a width and a height, the width being greater than the height, the member forming a tail that has a tail width that is less than the tail height, with the tail height being greater than the body height, the flange being arcuate so as to form a blunt edge adjacent to the body, the tail having a narrow edge where the tail couples to the body.

18. The lure of claim 10 wherein the member is crescent shaped.

19. The lure of claim 10 wherein the member is a first member, further comprising a second member that extends from the body, the first and second members being symmetrical with respect to a longitudinal axis of the body, the second member having second member side surfaces, with at least one of the second member side surfaces having a second flange protruding therefrom.

20. The fishing lure of claim 10 further comprising a gap that extends into the member and the side surfaces, the member side surfaces having increased thickness at a closed end of the gap.

* * * * *